D. A. T. GALE.
Nut and Coffee Roaster.
No. 91,009.
Patented June 8, 1869.
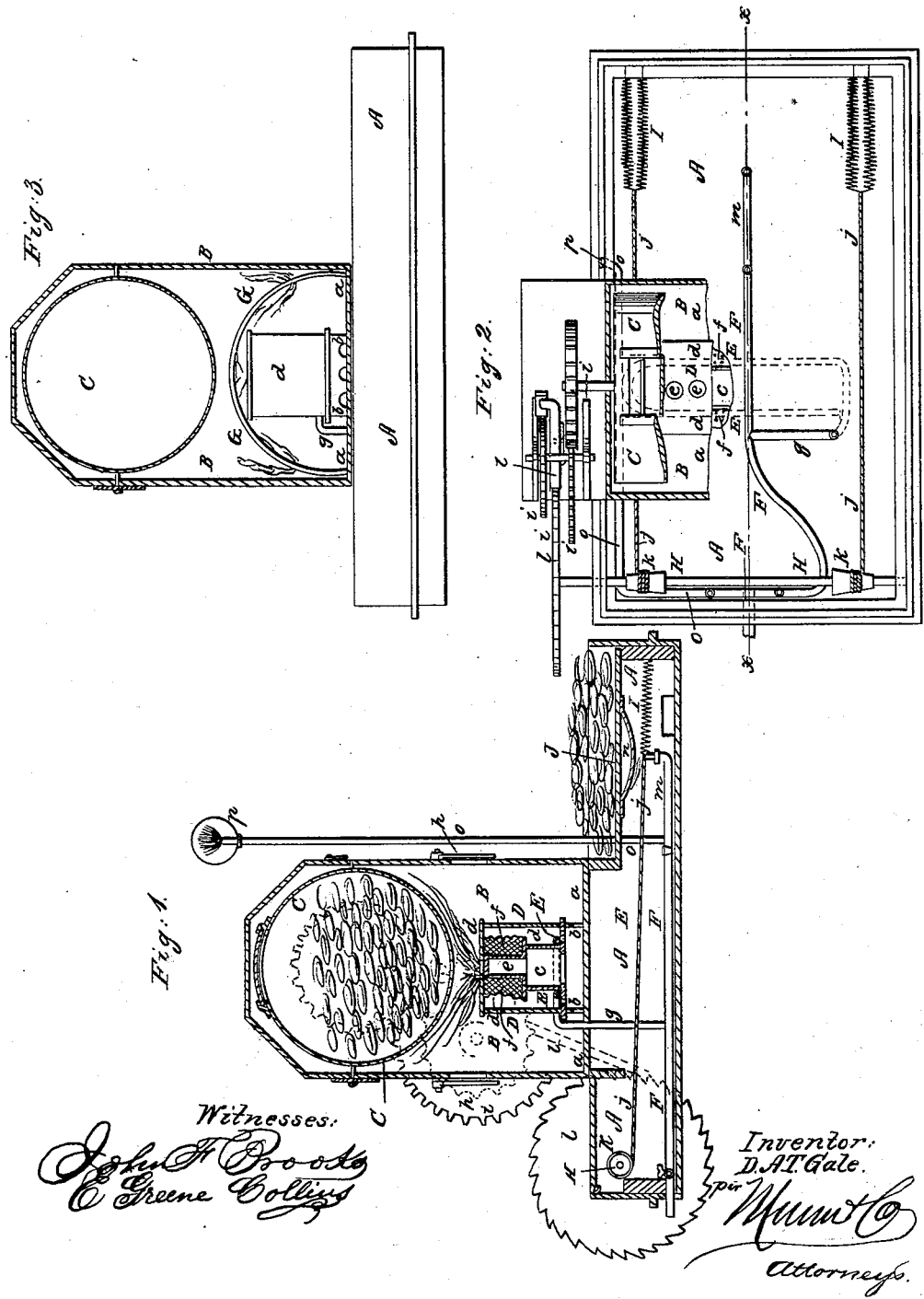

UNITED STATES PATENT OFFICE.

D. A. T. GALE, OF POUGHKEEPSIE, NEW YORK.

NUT AND COFFEE ROASTER.

Specification forming part of Letters Patent No. 91,009, dated June 8, 1869.

*To all whom it may concern:*

Be it known that I, D. A. T. GALE, of Poughkeepsie, in the county of Dutchess and State of New York, have invented a new and Improved Apparatus for Roasting Coffee, Nuts, &c.; and I do hereby declare that the following is a full, clear, and exact description thereof, which will enable others skilled in the art to make and use the same, reference being had to the accompanying drawing, forming part of this specification, in which—

Figure 1 represents a vertical longitudinal section of my improved roasting apparatus, the plane of section being indicated by the line $x\ x$, Fig. 2. Fig. 2 is a plan or top view, partly in section, of the same. Fig. 3 is a side view, partly in section, of the same.

Similar letters of reference indicate corresponding parts.

This invention relates to certain improvements in the apparatus for roasting nuts, &c., for which Letters Patent numbered 81,159 were granted to me on the 18th day of August, 1868.

The present invention has for its object to provide a more effective system of arranging the gas pipe and burner, an automatic power, and a device for allowing the roasting process to be carried on in a cylinder without revolving the same.

The invention consists, first, in a new burner arranged under the roasting-cylinder, and so arranged that in it the air and gas will be mixed to produce one large undivided body of flame.

The invention consists, second, in applying a series of coiled springs to a roller having conical drums for revolving the roasting-cylinder, as hereinafter more fully described.

A in the drawing represents the case or box containing the gas-pipe and other devices of my roasting apparatus. From its middle projects an upright chamber, B, in the ends of which the axle of the roasting-cylinder C has its bearings. The chamber B is separated from the box E by a partition, $a$. Under the roasting-cylinder is the burner D. The same is, by posts or perforated plates $b$, elevated above the plate $a$, and consists of two longitudinal boxes, $c$ and $d$, the former arranged within the latter, as in Fig. 1, and both extending nearly throughout the length of the chamber B. The box $c$ is open at the bottom, and has open tubes $e\ e$ projecting from its top plate nearly to the perforated top plate of the box $d$, as in Fig. 1. A wire screen, $f$, is arranged around the tubes $e\ e$ between the top plates of $c$ and $a$. The bottom plate of $b$, which is in line with that of $c$, is perforated around $c$.

The gas-pipe E is arranged within the box $d$, around the box $c$ in the lower part of $d$, and connects by a branch, $g$, with the main gas-pipe F in the box A. The pipe E is perforated at suitable intervals to emit numerous small jets of gas, which are mingled with air entering through the perforated supports $b$, and through the perforated bottom of $d$. This mixture of air and gas passes through the meshes of the screen $f$ into the same, and is there mixed with more air from the tubes $e$. It is ignited within the screen $f$, and forms therein a solid body of flame, that passes through apertures in the top plate of the box $d$ into the chamber B to heat the cylinder C. The sides of the chamber C are also perforated to have air brought in contact with the flame for aiding combustion. The sizes of these latter apertures can be regulated by means of dampers $h$.

When the cylinder is to remain stationary during the roasting process the shield or plate G, notched or perforated near its ends and sides, is interposed between the burner and the cylinder, as in Fig. 3, to divert the heat from the middle to the sides and ends of the cylinder. The cylinder in this latter case should be perforated, as shown. The cylinder, when to be revolved, is, by suitable gearing $i\ i$, connected with a horizontal shaft, H, which has its bearings in the box A, and which is, by means of cords or strings $j\ j$, connected with spiral springs I I, that are arranged within the box A, as shown. The strings or cords $j$ are wound upon cones $k\ k$, that are mounted on the shaft. When wound up the springs I are stretched, and will, with their tendency to contract, gradually unwind the cords from the shaft, thereby revolving the same, and also the cylinder.

An escapement or pendulum attachment, $l$, of suitable kind is arranged on the gearing to regulate the motion. The cones *k* will give the springs greater purchase as the same are getting weaker, thereby causing the power to be applied in a uniform manner.

The main gas-pipe F has a branch, *m*, leading under a horizontal roasting-plate, J, of the box A to the same by a flame under it, as shown. A curved plate, *n*, is attached to the under side of the plate J, for the purpose of receiving the direct heat from the flame, and for transmitting the same uniformly to the whole body of the plate J.

The pipe F has another branch, *o*, to feed a burner, *p*, which is to provide light in the evening. Each branch of the gas-pipe has a suitable cock, so that the gas may be directed to any one or all of the burners *o*.

Having thus described my invention, what I claim as new, and desire to secure by Letters Patent, is—

1. The combination of the spiral springs I with the strings *j*, cones *k*, and shaft H, all arranged to automatically revolve the roasting-cylinder, as specified.

2. In combination with the roasting-cylinder, the burner D, constructed, as described, of the boxes *c d*, pipes *e*, and screen *f*, all arranged as set forth, for the purpose specified.

D. A. T. GALE.

Witnesses:
W. J. REYNOLDS,
E. T. GALE.